US007997457B1

(12) United States Patent
Phillips et al.

(10) Patent No.: US 7,997,457 B1

(45) Date of Patent: Aug. 16, 2011

(54) SYSTEM AND METHOD FOR DELIVERING HYPER-CONCENTRATES

(75) Inventors: Wiley E. Phillips, New Orleans, LA (US); Glen P. Wisecarver, Hammond, LA (US); Michael C. Wisecarver, Harahan, LA (US); Richard A. Wisecarver, Harahan, LA (US); Rosario P. Kuylen, Hammond, LA (US); Michael G. Lindsay, Harahan, LA (US); Lawrence J. Folse, Bridge City, LA (US); Edwin G. Laiche, Harahan, LA (US)

(73) Assignee: WECHEM, Inc., Harahan, LA (US)

( * ) Notice: Subject to any disclaimer, the term of this patent is extended or adjusted under 35 U.S.C. 154(b) by 457 days.

(21) Appl. No.: 12/343,470

(22) Filed: Dec. 23, 2008

(51) Int. Cl.
*G01F 11/00* (2006.01)

(52) U.S. Cl. ...... 222/334; 222/1; 222/145.5; 222/145.6; 222/189.06; 222/190; 222/680; 222/630; 222/527; 239/310

(58) Field of Classification Search .............. 222/1, 334, 222/145.6, 190, 145.5, 608, 189.06, 529–530, 222/527, 538, 183, 372, 204, 394, 401; 239/317–318, 406–407, 310, 316; 417/181–182
See application file for complete search history.

(56) References Cited

U.S. PATENT DOCUMENTS

| | | | | |
|---|---|---|---|---|
| 2,381,589 | A * | 8/1945 | Hayes | 417/181 |
| 3,976,087 | A * | 8/1976 | Bolton et al. | 137/15.01 |
| 4,691,850 | A * | 9/1987 | Kirschmann et al. | 222/642 |
| 4,941,596 | A * | 7/1990 | Marty et al. | 222/144.5 |
| 5,259,557 | A * | 11/1993 | Spriggs et al. | 239/304 |
| 6,978,911 | B2 * | 12/2005 | Floyd et al. | 222/1 |

* cited by examiner

*Primary Examiner* — Frederick C. Nicolas
(74) *Attorney, Agent, or Firm* — Andrew G. Vicknair

(57) ABSTRACT

A system is disclosed for delivering hyper-concentrated chemicals in a ready to use non-concentrated state. The present invention affords users with the ability to dispense the hyper-concentrated chemicals in a safe electrical free environment as the system operates from fluid force. The present invention may work off a water supply being used as the primary power supply that is also used to dilute the hyper-concentrated chemical. The present invention may be configured for use in any number of environments, such as refineries, off-shore platforms, food processing facilities, agriculture facilities, and the like.

20 Claims, 6 Drawing Sheets

SYSTEM AND METHOD FOR DELIVERING HYPER-CONCENTRATES

TECHNICAL FIELD

The present invention relates, in general to hyper-concentrated chemical delivery and dispensing systems, and more specifically to systems that can dispense hyper-concentrated chemicals in a ready-to-use non-concentrated state by diluting the hyper-concentrated chemical so that users are able to economically and efficiently use the hyper-concentrated chemical as if the hyper-concentrate was in a diluted/non-concentrated state.

BACKGROUND OF INVENTION

It is no surprise that the chemical and petrochemical industry and its various production facilities are dirty. The facilities, vessels, mixers, equipment, structures, and machinery utilized in these industries become covered with dirt, grease, grime, and various other types of waste during use. Thus, an enormous amount of time and money is spent cleaning the various types of waste and dirt generated in such an environment, such as refineries, offshore drilling platforms, dive support vessels, construction vessels, chemical production facilities and the like.

Due to the extent and severity of waste, dirt, grime, grease, and the like that accumulates in and around the facilities of the chemical and petrochemical industry, such as offshore platforms, oil refineries, chemical production facilities, storage tanks and holding vessels, substantial quantities of industrial cleaners and degreasers are continuously needed and purchased to clean the various components that make up these industrial facilities. Currently, the refineries and chemical production facilities acquire industrial cleaners and degreasers by purchasing the industrial cleaners and degreasers in a ready-to-use state wherein the cleaners and degreasers are in a non-hyper-concentrated state. In the non-hyper-concentrated state, these cleaners and degreasers have already been diluted with water. In such a diluted state, these types of cleaners and degreasers are ordered and transported to the various facilities in oversized bulk tanks, totes, or multiple drums. While purchasing the cleaners and degreasers in the oversized containers is a way to keep the industrial cleaners and degreasers on site, the mere size of the oversized drums, totes, or multiple drums is a problem. With the large oversized drums, totes, and tanks there is always a potential for a substantial chemical spill. In addition, the bulk tanks, oversized drums and totes also occupy a lot of space. Further, the disposal of the oversized bulk tanks, totes, and drums, once they are empty, is another disadvantage that the facilities have to deal with in obtaining industrial cleaners and degreasers in oversized drums, totes, or tanks.

Accordingly, a need exists in the art for a system that can dispense the needed industrial cleaners and degreasers without the cleaners and degreasers having to exist in the oversized bulk tanks, totes, or multiple drums while still delivering the same amount of cleaner and/or degreaser. Purchasing more cleaners and degreasers in smaller holding tanks is not the answer as the user is simply left with even more holding tanks, drums, or totes to dispose.

BRIEF SUMMARY OF THE INVENTION

The present invention is directed to a system and method for hyper-concentrated chemical delivery and dispensing. The system and method may comprise a primary liquid supply, such as water, a hyper-concentrated chemical, such as a solvent based cleaner that contains little to no water, a dispenser unit, a supply hose, an input hose, a mixing chamber, and an output hose. An input hose may supply the primary liquid supply water, to the dispenser unit, while a supply hose connects the hyper-concentrated chemical to the dispenser so that the dispenser unit may pull the hyper-concentrated chemicals into the dispenser to be transported to a mixing chamber so that a primary liquid, such as water, can be mixed with the hyper-concentrated chemical to achieve a user-desired ready to use chemical, such as a solvent based cleaner.

The dispenser unit of the present invention may be a pump capable of extracting various amounts of the hyper-concentrated chemicals from a hyper-concentrated chemical supply and then moving or displacing the hyper-concentrated chemicals into a mixing chamber/area where the hyper-concentrated chemical can be mixed with the primary liquid supply, which may be water, to create an appropriately user-defined ready-to-use chemical mixture. After the primary liquid supply and the hyper-concentrated chemicals are combined and/or mixed, the system may then discharge the ready-to-use mixture through an output hose such that a user may utilize the output hose to spray or discharge the ready-to-use mixture as needed. For example, a user may spray the ready-to-use mixture to the inside or outside of a tank that is to be cleaned with the ready-to-use mixture.

In a preferred embodiment, the entire hyper-concentrated chemical delivery and dispensing system is mobile and the system can be easily relocated from location to location depending on a user's needs. In such a mobile configuration, the system may be mounted on a stand that is configured to house the hyper-concentrated chemical below, next to, or near the dispensing components. Thus, when a user is ready to move the entire hyper-concentrated chemical delivery and dispensing system, the user simply disconnects the primary liquid supply and then moves the stand (possibly with the help of a forklift or dolly) to a desired location and only has to re-connect the system to a primary liquid supply, such as a new water supply, and then the system is ready for use. While the system is mobile, an embodiment of the present invention may be further configured so that the system can be easily moved by a user without the need to utilize outside assistance, such as the use of a forklift or dolly. In such an easy-to-move embodiment, the system may be mounted on some type of stand, cart, frame, or other structure with wheels whereby that stand with wheels includes room for the hyper-concentrated chemical to be located just below the dispensing unit so that all that is needed is a primary liquid supply, such as a water supply, in order for the system to operate. In such an easy-to-move embodiment, a user could then utilize the stand/cart on wheels to transport the easy-to-move system from location to location as needed for cleaning. For example, if the system were being used throughout an oil refinery for the purpose of supplying solvent based cleaners to clean tanks or other equipment, the easy-to-move system could be arranged so that the hyper-concentrated chemical is a drum of hyper-concentrated solvent-based cleaner and/or degreaser wherein a user could transport the easy-to-move system from location (tank) to location (tank). After transporting the easy-to-move unit, the user would hook up a water source to the input hose to provide the power/force needed to operate the dispenser/pump and to dilute the hyper-concentrated chemical to achieve a proper mixture. Then, the easy-to-move system with wheels could be relocated from one location to another as opposed to having to store large totes or tanks of cleaners and/or degreasers at every location the cleaner and/or degreaser would be used to clean equipment. As a result, less containers of cleaners and/or degreasers are needed thereby reducing the costs of purchasing and storing several large containers of cleaners and/or degreasers due to the use of the hyper-concentrate.

By utilizing the present invention, a user is able to save money through various aspects provided by the present invention. For starters, the hyper-concentrated chemicals that may be utilized with the present invention are preferably hyper-concentrated solvent based cleaners and/or degreasers that contain little to no water. Thus, a user saves money because the user would only have to purchase the hyper-concentrated chemicals as opposed to purchasing the ready-to-use chemicals which consist of large quantities of water. By purchasing hyper-concentrates and dispensing the hyper-concentrates with the present invention, the user is no longer paying for the water that is within the ready-to-use chemicals because the user will utilize his own water supply in conjunction with the present invention to convert the hyper-concentrate into a ready-to-use state. In purchasing hyper-concentrates, the containers holding the hyper-concentrates are significantly smaller and lighter than the over-sized drums and totes used to hold the ready-to-use chemicals. Thus, a user requires less storage space because the user no longer has to store several large ready-to-use containers of cleaners and/or degreasers. In addition, the transportation costs are decreased because the user is no longer utilizing the large oversized and heavy totes and containers of ready-to-use cleaners. For example, in off-shore platforms, transportation costs are associated with all supplies and materials shipped to an offshore location. By utilizing the present invention, a user will be shipping less weight and require less storage space because the user can purchase and transport the hyper-concentrates in smaller and lighter containers, and the user can later convert the hyper-concentrates to a ready-to-use state with the present invention when needed. In the end, the user saves money through reduced storage space, reduced transportation costs, and reduced chemical costs because the user will ultimately use his own primary liquid supply, such as water, to achieve the desired ready-to-use chemical mixture. By utilizing the present invention, a user is no longer paying to transport, store, or purchase another's primary liquid, such as water, because the user will utilize his own primary liquid supply, water, when needed.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
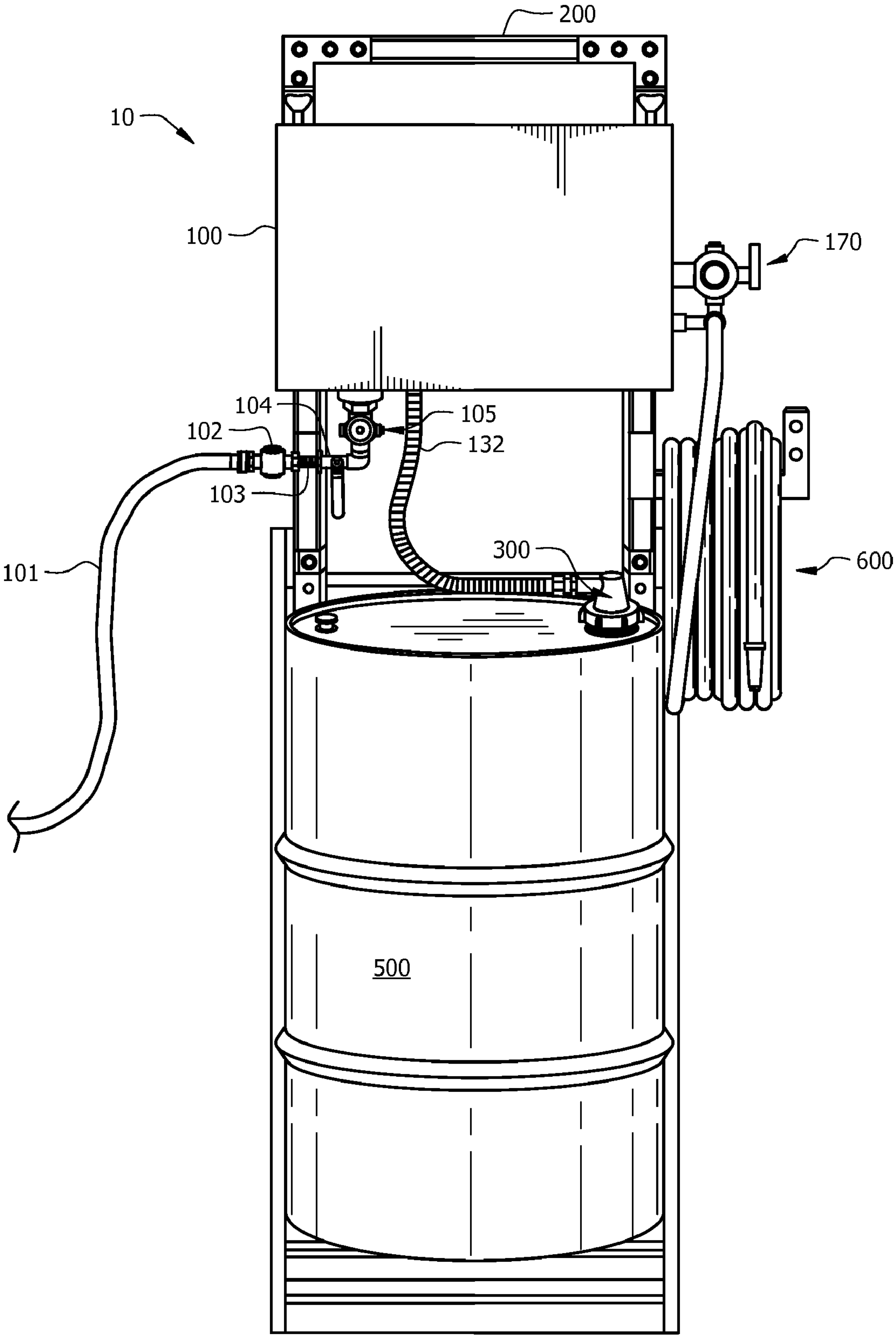
FIG. 1 is an illustration of one embodiment of the present invention.
Figure 2:
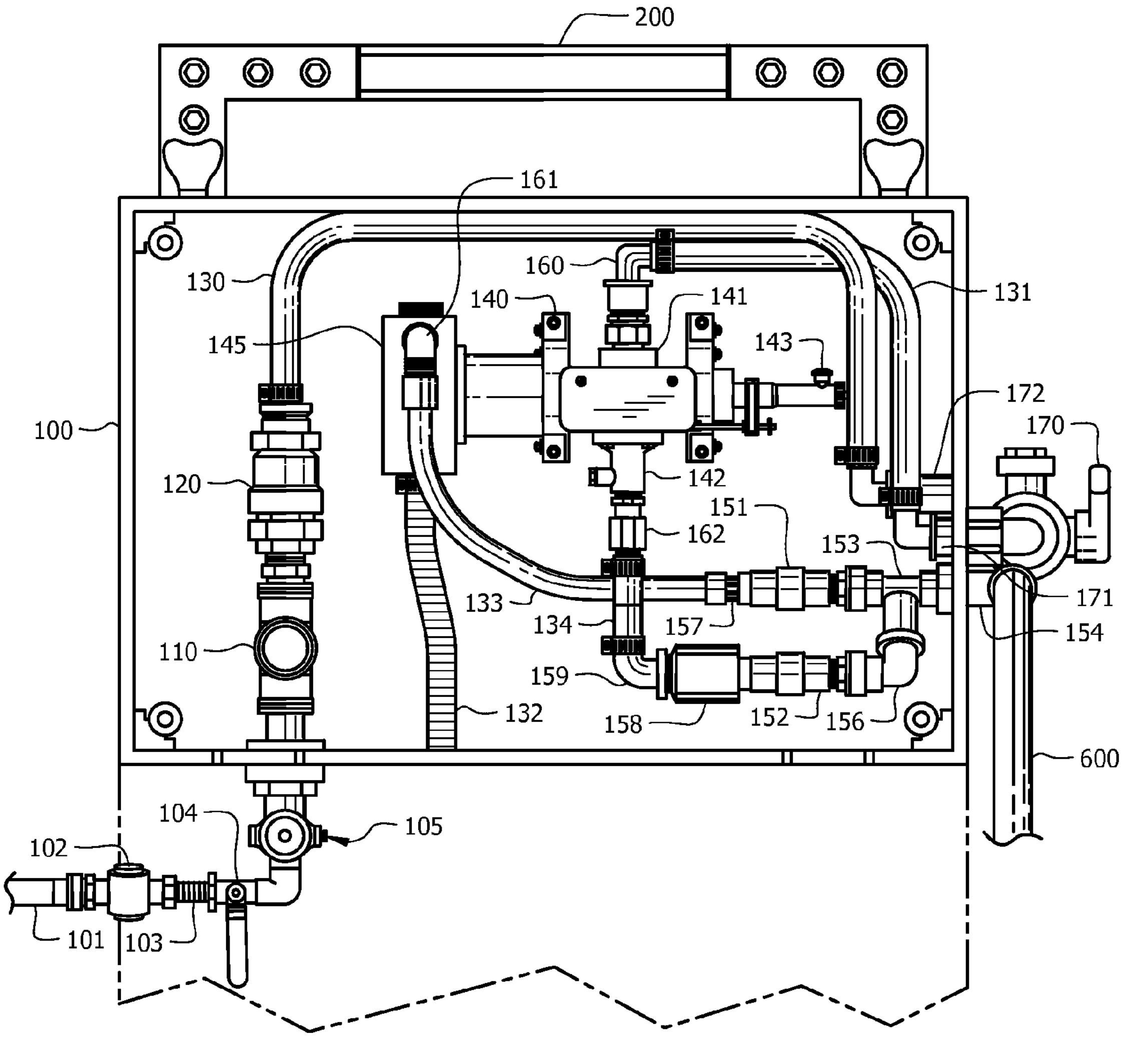
FIG. 2 is an illustration of various components of an embodiment of the present invention.

FIG. 1 is an illustration of one embodiment of chemical diluting and dispensing system 10. In one embodiment, chemical diluting and dispensing system 10 provides an electrical free liquid flow powered dispensing system for diluting hyper-concentrated chemicals and delivering the diluted chemical mixture. Chemical diluting and dispensing system 10 includes enclosure 100 and stand 200. Enclosure 100 houses and holds some of the various components that make up chemical diluting and dispensing system 10 as illustrated in FIG. 2, such as pressure regulator 110, backflow preventer 120, primary liquid hose 130, pump supply hose 131, chemical input hose 132, chemical output hose 133, pump output hose 134, pump 140, check valves 151 and 152, mixing tee 153, and connectors 156, 157, 158, 159, 160, 161, and 162.

Enclosure 100 may be fabricated from some type of weather resistant material, such as plastic, ABS (Acrylonitrile-Butadiene-Styrene) plastic, fiberglass, polycarbonate, steel, stainless steel, chrome, aluminum, and the like. As illustrated in FIG. 1, enclosure 100 is a weather-proof enclosure configured so that when the door of enclosure 100 is closed, the inside of enclosure 100 is sheltered from the surrounding environment such that the inside of enclosure 100 is protected from the surrounding environment and atmosphere, which may comprise any number of components, such as rain, heat, other liquids, chemicals, ice, hail, sleet, snow, fog, smog, smoke, and the like. In a preferred embodiment, enclosure 100 also includes a drain, preferably located in the bottom of enclosure 100, that will allow any liquids, such as the hyper-concentrated chemical or primary liquid that may be leaking out of the various components within enclosure 100 to drain out of enclosure 100. The drain also acts as a warning/indicator that can notify users of the existence of a leak by the mere fact that materials are flowing out of the drain.

Enclosure 100 is not limited to the configuration illustrated in FIG. 1 as it may be arranged in any number of different configurations. For example, the door may be attached to enclosure 100 with the use of hinges located on any of the walls of enclosure 100. Enclosure 100 may also be configured such that the door may connect to and/or attach to any of the walls of enclosure 100 with another type of securing mechanism such as a latch, screw, lock, clip, and the like. Thus, the door may secure to and completely close off enclosure 100 with the use of either said hinges or said securing mechanisms so that anything within enclosure 100 will be sheltered/protected from various components of the environment in which enclosure 100 is located. Enclosure 100 may also be configured so that it can be locked by a user to prevent unauthorized personnel from adjusting the settings of the various components within enclosure 100, such as the settings of pump 140. The use of such a lock to secure enclosure 100 provides an added safety and security feature to the present invention.

In one embodiment, enclosure 100 may be configured so that the outer surfaces of enclosure 100, are coated with some type of insulating material that acts to insulate enclosure 100 from various conditions, such as temperature, noise, vibration, electrical shock, acid rain, biological organisms, weapons, and the like. For example, the outer surfaces of enclosure 100 may be coated with a ceramic coating to help insulate enclosure 100 and any components that may be mounted within enclosure 100 from these various conditions.

In a preferred embodiment, stand 200, as illustrated in FIG. 1, is utilized to provide a mounting location for enclosure 100 and the components within the enclosure 100 and provides a resting location for the hyper-concentrated chemical container, such as bulk chemical supply 500. While stand 200 is illustrated in FIG. 1 as comprising different members made from metal Unistrut® members, the present invention is not limited to such configuration as stand 200 may be made of any number of materials configured in any number of different configurations. In some embodiments of the present invention, stand 200 may also be configured to include a holder that is capable of holding various objects, including, but not limited to a hose, such as hose 600 of FIG. 1, Such holder, may also be configured to hold any number of objects that may be utilized with the present invention, such as cleaning brushes, sponges, hose nozzles, spare hoses, and the like. With stand 200, all components of system 10 may be either mounted to, resting on, or attached to stand 200 so that the entire hyper-concentrated chemical delivery and dispensing system is mobile and may be easily relocated from location to location depending on a user's needs. For example, a user can move stand 200 by simply disconnecting primary liquid supply at hose 101 and then utilizing a forklift, dolly, or the like to transport stand 200 from one location to another. While chemical diluting and dispensing system 10 is mobile, an embodiment of the present invention may be further configured so that the system can be easily moved by a user without the need to utilize outside assistance, such as the use of a forklift or dolly. In such an embodiment, the present invention may be configured so that wheels are added to stand 200 or wheels are added to a different type of stand, cart, frame, or other structure that can hold/house the components of system 10 so that system 10 is easy-to-move without the need for outside assistance. In such an embodiment, the stand/cart/frame with wheels includes room for the hyper-concentrated chemical to be located just below or near the dispensing unit so that all that is needed is a primary liquid supply, such as a water supply, in order for the system to operate. This easy-to-move embodiment is advantageous as it can allow a user to move system 10 from location to location depending on the user's needs. For example, if a user needed to clean a piece of equipment in a first location and also needed to clean a different piece of equipment in a remote location in a chemical processing plant, the user could simply transport the easy-to-move system with wheels from the first location to the remote location as opposed to having to store large totes or tanks of cleaners or degreasers at every location where the cleaner or degreaser would be used to clean equipment. The only thing needed when system 10 is moved from location to location whether in an embodiment with wheels or without wheels is a primary liquid supply/source at or near the location of use. If a primary liquid supply is not nearby, then a user can simply utilize a longer hose for hose 101 to bring the primary liquid supply, such as water, to system 10 if it were being used in a location that was not close to a primary liquid supply.

Figure 3:
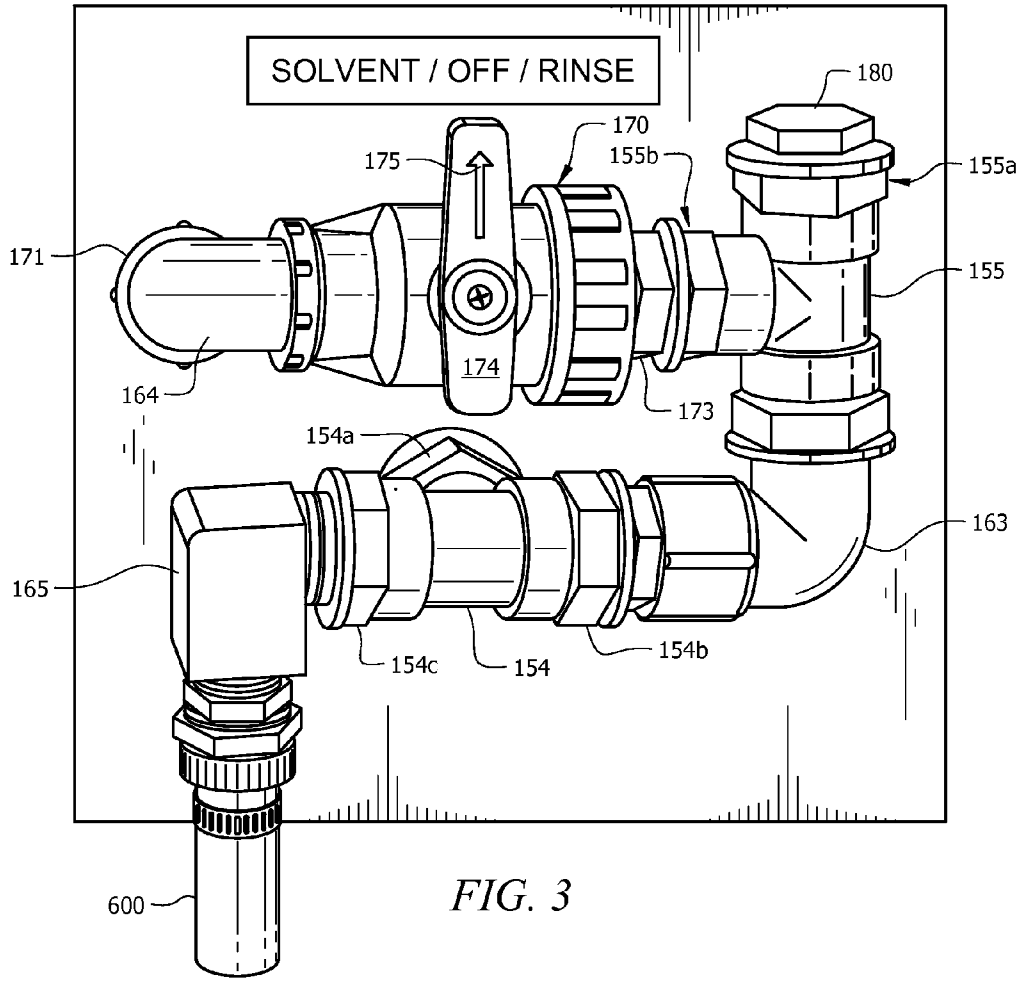
FIG. 3 is an illustration of a side view of an embodiment of the present invention.

As illustrated in FIGS. 2 and 3, chemical diluting and dispensing system 10 may be configured so that some components of system 10 are positioned outside of enclosure 100, such as valve 170, output tee 154, bucket tee 155, connectors 163, 164, and 165. In addition, as illustrated in FIGS. 1 and 2, strainer 105, shut-off valve 104, nipple 103, coupling 102, and primary supply hose 101 may also be located outside of enclosure 100.

Figure 4:
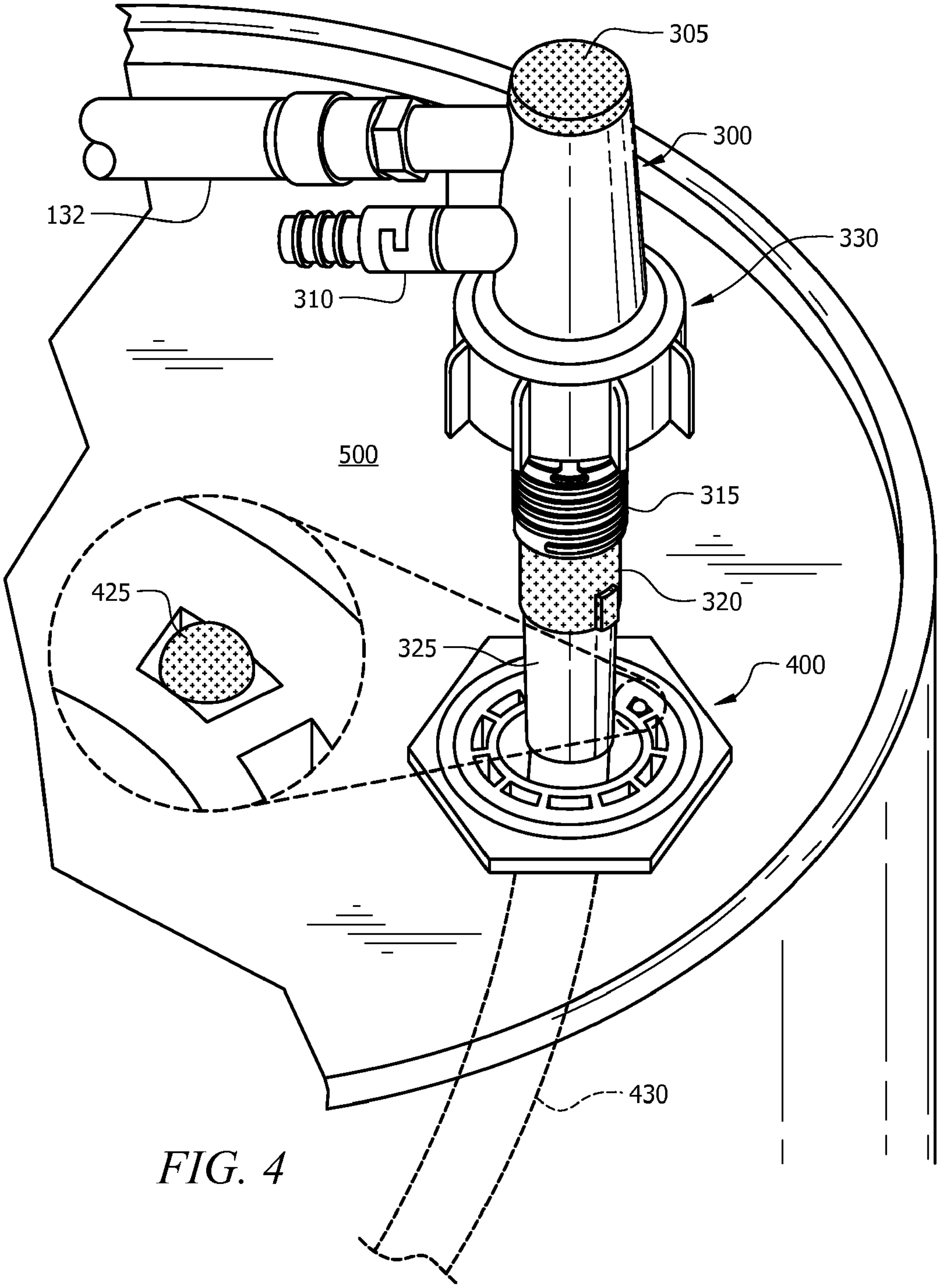
FIG. 4 illustrates a close up top view of a portion of an embodiment of the present invention connecting to a hyper-concentrated chemical supply.
Figure 6:
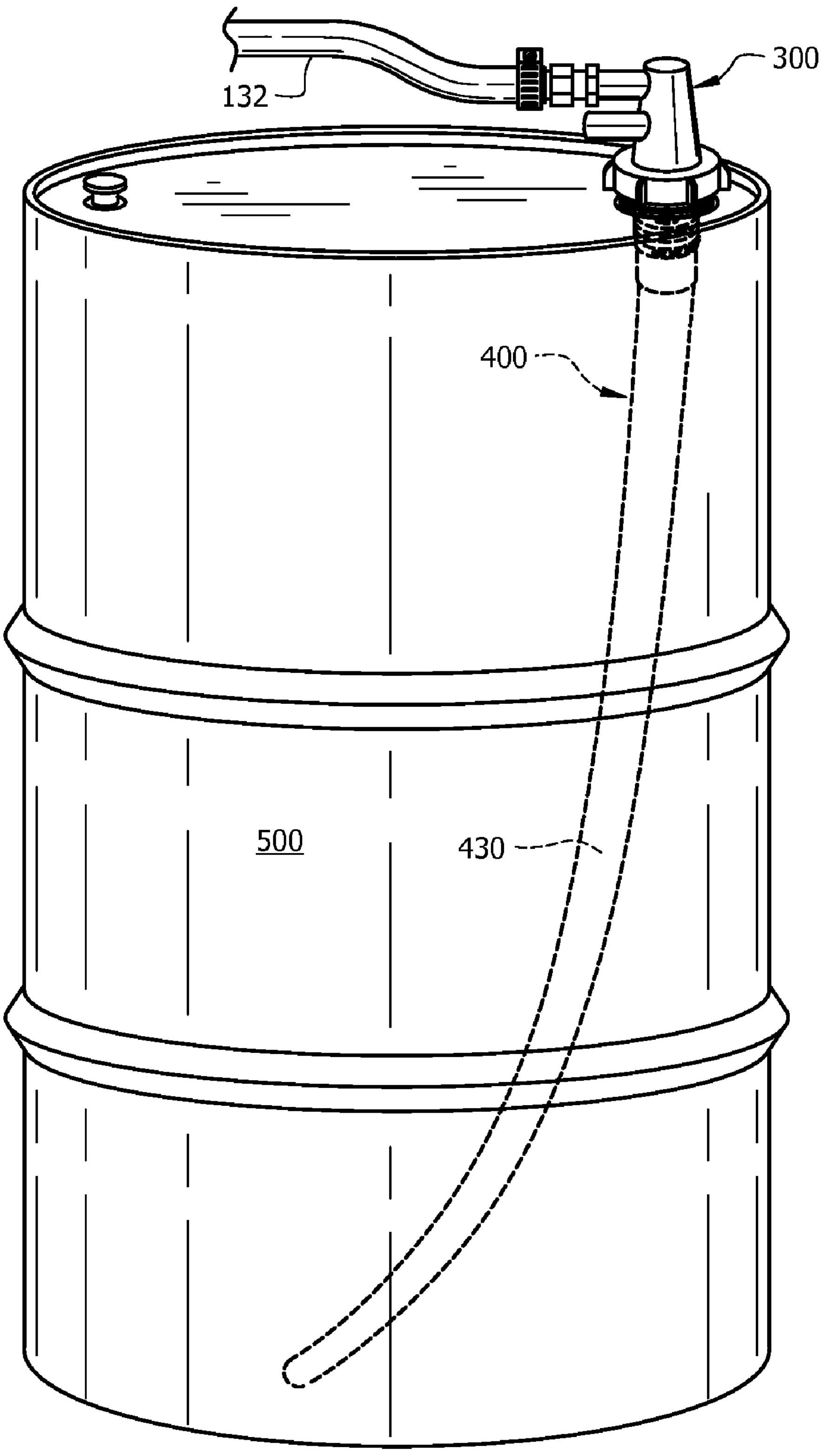
FIG. 6 is another illustration of a drum/container insert connected to a drum containing the hyper-concentrated chemical

Chemical diluting and dispensing system 10 is advantageous as it operates on liquid power/force to drive pump 140 which will in turn provide a pulling-up/suction force to pull/suction chemicals from bulk chemical supply 500 through chemical input hose 132. As illustrated in FIGS. 1, 4, and 6 chemical diluting and dispensing system 10 sucks the hyper-concentrated chemical, such as a solvent/soap, from a bulk chemical supply 500, such as a drum, barrel, tote, or the like. As illustrated in FIGS. 4 and 6, chemical input hose 132 is connected to bulk chemical supply 500 with coupler 300 and insert 400.

Figure 5:
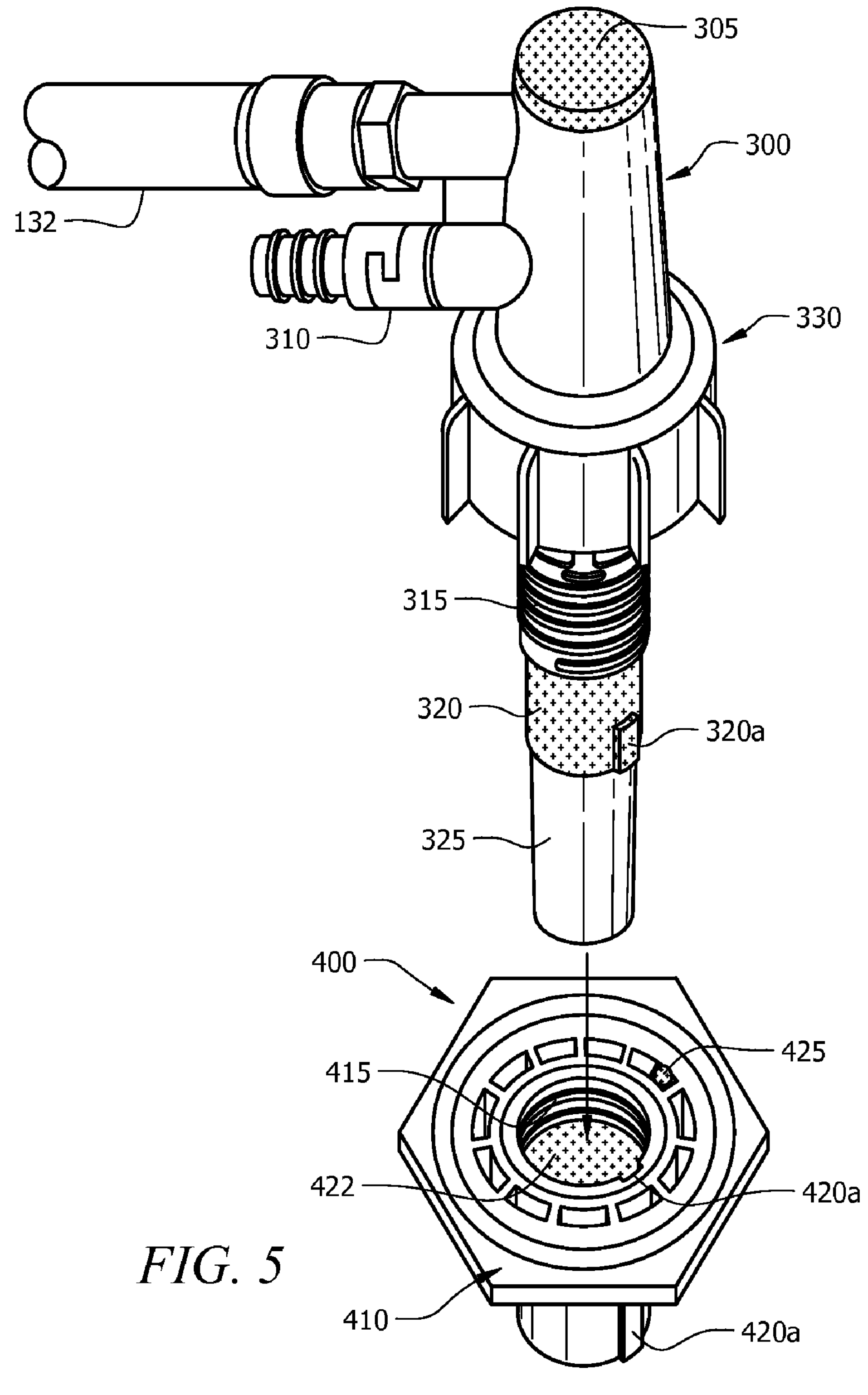
FIG. 5 is an illustration of a drum/container insert and some of the connections utilized in an embodiment of the present invention.

As illustrated in FIG. 5, insert 400 includes adaptor member 410, an inner threaded portion 415, a color coded key member 420, a color coded dot 425, and a tube member 430. As further illustrated in FIGS. 4 and 5, coupler 300 may be configured to include color coded cap 305, vent valve 310, threaded portion 315, color coded key member 320, tube member, 325, and round handle 330.

Insert 400 is advantageous as it provides a pathway for sucking/retrieving the hyper-concentrated chemicals out of bulk chemical supply 500. Insert 400 provides another safety feature in that once an insert 400 is connected to and inserted into a hyper-concentrated chemical supply, such as bulk chemical supply 500, it is not removed by a user. Thus, a user would not have to come into contact with the hyper-concentrated chemical as the user would not have to worry about removing insert 400 from the bulk chemical supply after it has been initially inserted by a supplier. Further, the present invention is configured so that the cost of insert 400 is minimal and insert 400 may be discarded with the empty drum/tote, such as bulk chemical supply 500, to increase safety by eliminating the need for a user to have to remove insert 400. As illustrated in FIGS. 4 and 5 adaptor member 410 of insert 400 may be circular in shape and sized to fit inside a circular opening of bulk chemical supply 500. However, the present invention is not limited so that adapter member 410 must be circular in shape, as some embodiments of the present invention may be configured with an insert 400 that includes an adapter member 410 that may take the form of any number of geometric shapes depending on the configuration, type, and/or shape of a chemical supply that insert 400 is placed inside. Inner threaded portion 415 is an area of insert 400 that is threaded to receive the corresponding threaded portion 315 of coupler 300 in order to provide a securing mechanism for securing coupler 300 to insert 400 to ultimately facilitate the transfer of the hyper-concentrated chemicals out of bulk chemical supply 500. Color coded key member 420 is a keyed member that is preferably located below threaded portion 415 that acts to further secure and lock coupler 300 to insert 400 when a corresponding color coded coupler 300 is connected to insert 400. Color coded dot 425 is a color coded piece of material preferably located on insert 400 to clearly identify the color coded configuration of insert 400. It simply provides another color identifier in addition to color coded key member 420.

Color coded key member 420 and color coded dot 425 assists users by identifying, signaling, and/or notifying users that only couplers 300 with matching corresponding color coded parts (such as color coded cap 305 and color coded key member 320) should be connected to insert 400 and bulk chemical supply 500. This also assists in increasing safety and cutting back on mistakes and accidents by assisting users to only connect couplers 300 to inserts 400 with matching color configurations. In addition, a preferred embodiment of the present invention is configured so that only matching color coded key members of insert 400 and coupler 300 (key members 420 and 320) will connect to one another. For example, if a user accidentally tried to connect a coupler 300 with red color coded parts to an insert 400 with green color coded parts, the two would not connect or fasten to one another. For instance the corresponding keys of different colors (320 and 420) would not line up; thereby preventing a connection.

As illustrated in FIG. 6, tube member 430 of insert 400 is preferably a hollow cylindrical tube that extends down into bulk chemical supply 500 to provide a pathway for the hyper-concentrated chemical to be sucked up by pump 140. Tube member 430 is not limited to any particular length as the length will be dictated by the configuration of the container holding the hyper-concentrated chemical. For example, as illustrated in FIG. 6, bulk chemical supply 500 is a barrel and in such an environment, tube member 430 will be long enough to reach the bottom of the barrel. In a preferred embodiment, tube member 430 is installed with a curvature so that when insert 400 is positioned in the bulk chemical supply 500, the end of tube member 430 will be located at the bottom of the bulk chemical supply 500 that is opposite of the side where insert 400 is positioned in bulk chemical supply 500. For example, in FIG. 6, insert 400 enters the right side of bulk chemical supply 500 so that tube member 430 extends into bulk chemical supply 500 and ends at or near the bottom left side of bulk chemical supply 500. By extending to the opposite end of bulk chemical supply 500, tube member 430 provides the benefit of enabling users to utilize a greater percentage of the hyper-concentrated chemicals in bulk chemical supply 500 before a user has to replace bulk chemical supply 500 with a new chemical supply. Such configuration of tube member 430 is further advantageous as chemical containers, such as a drum or barrel, that have less than a certain percentage of chemical remaining in the container after use may not have to be washed out prior to disposal or recycling. This helps to cut back on labor that would otherwise be spent washing out the containers. For instance, with tube member 430 in FIG. 6 extending to the left bottom of the container, a user is able to utilize a greater percentage of the chemical thereby reducing the percentage of chemicals remaining in the container so that it is possible to dispose of and/or recycle the container without wasting time and resources spent washing out the container.

Coupler 300, illustrated in FIGS. 4 and 5, functions to connect chemical input hose 132 to insert 400 thereby creating a path for the chemicals in bulk chemical supply 500 to reach pump 140. In a preferred embodiment, coupler 300 contains color coded cap 305, vent valve 310, threaded portion 315, color coded key member 320, tube member, 325, and round handle 330.

Color coded cap 305 and color coded key member 320 are color indicators on coupler 300 to assist users in making sure that couplers configured with a particular color coded cap 305 and color coded key member 320 are only connected to inserts 400 that also contain matching color coded components, such as color coded key 420 and color coded dot 425. Coupler 300 may also be configured with vent valve 310 that is utilized to provide venting for bulk chemical supply 500. By providing a means of venting, vent valve 310 is advantageous as it operates to prevent any vacuum within bulk chemical supply 500 from collapsing whatever type of container that is holding the hyper concentrated chemical, such as the drum/barrel of bulk chemical supply 500 of FIGS. 1 and 6. As chemicals are drawn/sucked out of bulk chemical supply 500, vent valve 310 may allow air to vent into the container (barrel, drum, tote, etc.) which in turn will assist in preventing a vacuum from dangerously collapsing the container housing the hyper concentrated chemical. Vent valve 310 also increases the safety of the present invention as it operates to prevent any air/fumes, such as any fumes from the hyper-concentrated chemical, from escaping out of bulk chemical supply 500. Thus, vent valve 310 can cut down on the chances of a user being exposed to any chemical fumes associated with the hyper-concentrated chemical. Thus, vent valve 310 will allow air to vent into the container but it will prevent any fumes from escaping out of the container.

Outer threaded region 315 of coupler 300 is sized to screw into inner threaded portion 415 of insert 400. This threaded region 315 provides a means to securely fasten coupler 300 to insert 400 and bulk chemical supply 500. Color coded key member 320, similar to color coded key member 420 of insert 400, is a keyed member including a keyed portion 420A that aligns with keyed portion 320A of color coded key member 320, that is preferably located below threaded portion 315 and outside of tube member 325 that acts to further secure and lock coupler 300 to insert 400 when coupler 300 is inserted in and connected to a corresponding color coded insert 400. Color coded key member 320 is preferably configured so that it will only fit in/lock to a color coded key member 420 that is of same color via keyed portions 320A and 420A. Coupler 300 also contains tube member 325 that is preferably configured to extend down below color coded key member 320 and into insert 400. However, the present invention is not limited to such a configuration as tube member 325 may be configured at any length. Tube member 325 may be sized smaller than tube member 430 of insert 400 so that it may extend down into tube member 430 to provide a path for chemicals sucked up tube member 430 to pass on to chemical input hose 132. However, in an alternative embodiment, tube member 325 may be configured to simply line up and butt up against tube member 430 and still provide a path for chemicals to flow on to input hose 132.

Round handle 330 of coupler 300 functions to provide users with a means to tighten and screw coupler 300 into insert 400. While round handle 330 is illustrated in FIGS. 4 and 5 as comprising a number of protruding tabs for a user to grip and turn, round handle 330 is not limited to any particular configuration. It may comprise any number of shapes or configurations that enable users to grip and turn so that users can tighten coupler 300 to insert 400. Coupler 300 may also be configured to include a quick-coupler shut-off valve that operates as a safety feature to prevent drainage of chemicals from hose 132 out of tube member 325 whenever coupler 300 is disconnected from insert 400. For example, when a user has utilized all of the hyper-concentrated chemicals in bulk chemical supply 500, a user will have to disconnect coupler 300 from insert 400 and replace bulk chemical supply 500 with a full container. When coupler 300 is disconnected from insert 400, any chemicals remaining in input hose 132 may tend to drain out of hose 132 through coupler 300 and out of tube member 325. Such drainage can be a safety hazard as it may expose users to the hyper-concentrated chemicals. Thus, coupler 300 may include a quick-coupler shut-off valve located within coupler 300 that operates to prevent the flow of chemicals from input hose 132 back out of coupler 300 through tube member 325. As such, this shut-off valve will prevent chemicals from draining out of input hose 132 into tube member 325. In a preferred embodiment, coupler 300 will include a quick-coupler shut-off valve that is naturally in the closed/seated position so that chemicals will only flow through coupler 300 when the suction force created by pump 140 unseats the quick-coupler shut-off valve to allow chemicals to enter hose 132 and into pump 140. Thus, when disconnecting coupler 300, there will be no suction force from pump 140 and the quick-coupler shut-off valve in coupler 300 will be closed; thereby preventing chemicals from flowing out of coupler 300 when it is disconnected from insert 400. In an alternative embodiment, the present invention may be configured so that a backflow preventer or other type of valve or other flow restrictor is connected to hose 132 to further prevent any chemicals from flowing back down and out of hose 132.

As discussed herein, the color coded components of coupler 300 and insert 400 add an increased awareness and safety to the present invention. The color coded components function to assist users in making sure that only couplers 300 and inserts 400 containing the same color configurations will be connected to one another. For example, coupler 300 includes color coded key 320 and color coded cap 305 to assist in signaling or notifying users that only the bulk chemicals containing an insert 400 with the same color coded configuration and components (color coded key 420 and dot 425) should be connected to coupler 300. For example, the color green may signify the use of a specific solvent based chemical. Thus, a coupler 300 with green color coded components will only connect to a bulk chemical supply 500 that includes an insert 400 that is also color coded green because a green color coded key 320 of coupler 300 will only connect and lock into a green color coded key 420 of insert 400. The color coding is further advantageous as it adds an additional safety feature in that only matching components are utilized with one another.

Once a hyper-concentrated chemical supply, such as bulk chemical supply 500, is connected to chemical input hose 132, the system is ready for use. The liquid power/force is supplied by a constant flow and supply of a primary liquid, such as a user's water supply, through primary supply hose 101 as illustrated in FIG. 1. The present invention may be configured to accept a user's primary liquid supply, such as water, from a flexible hose, pipe, or other delivery means. In a preferred embodiment, a user's primary liquid supply, water, is connected to chemical diluting and dispensing system 10 through a secure connection mechanism, such as a coupling crow's foot connector 102, as illustrated in FIGS. 1 and 2. However, the present invention is not limited to the use of a crow's foot coupling as any type of connector that can securely connect a user's primary liquid supply, such as a water supply, to system 10 will work.

As illustrated in FIGS. 1 and 2, the present invention may also be configured to include threaded nipple 103, shut-off valve 104, and strainer 105. Nipple 103 simply acts as a connector to connect coupling connector 102 to shut-off valve 104. In alternative embodiments, connector 102 may be configured to connect directly to shut-off valve 104 without utilizing nipple 103. Shut-off valve 104 acts as a means whereby a user can shut-off the supply of the primary liquid in supply hose 101 to system 10. For example, if a user needed to quickly shut down system 10 and/or quickly shut off force/power to pump 140, a user could quickly close shut-off valve 104. System 10 may also be configured so that shut-off valve 104 is connected to strainer 105 with some type of connecter such as a nipple, elbow, or other similar connector or the present invention may be configured so that strainer 105 is directly connected to shut-off valve 104. Strainer 105 operates to screen out or filter the primary liquid supply so that any debris, sediment or other materials within the primary liquid supply are filtered out and do not pass on to the remaining components of system 10. Thus, strainer 105 functions to make sure that only the primary liquid supply, water, in primary supply hose 101 will pass on to the remaining components of system 10. In an alternative embodiment, system 10 may be configured to include a by-pass piping system that allows the primary liquid supply to bypass strainer 105 in the event that strainer 105 is clogged with debris and must be cleaned. In such a configuration a user is enabled to utilize the by-pass piping to by-pass strainer 105 and to continue using system 10 while strainer 105 is being cleaned or replaced.

As illustrated in FIG. 2, one embodiment of the present invention may be configured so that the output side of strainer 105 extends through an opening in enclosure 100 and connects to pressure regulator 110. However, the present invention is not limited to such a configuration as system 10 may be configured so that strainer 105 is located within enclosure 100. Strainer 105 may be connected directly to pressure regulator 110 or the present invention may be configured so that some type of connector, such as a union, nipple, coupling, and the like, is utilized to connect strainer 105 to pressure regulator 110. Pressure regulator 110 operates to protect the components downline of pressure regulator 110 should the pressure of the primary liquid supply from primary supply hose 101 exceed a pre-set pressure of pressure regulator 110. For example, a user may configure/set pressure regulator 110 to activate/regulate at 60 pounds per square inch (psi), and if the pressure in the primary liquid supply from primary supply hose 101, such as water, exceeds the 60 psi limit, pressure regulator 110 may react and automatically cut off the flow of the primary liquid supply from primary supply hose 101 at pressure regulator 110 and prevent such high pressure liquid supply from flowing through the remainder of chemical diluting and dispensing system 10. In cutting off the flow, pressure regulator 110 acts to insure that the pressure downline of pressure regulator 110 does not exceed 60 psi. System 10 is not limited to any particular type of pressure regulator as it may include a regulator that completely cuts off the flow of the liquid supply at a certain pressure or it may act to simply reduce and regulate the pressure of the primary liquid supply to some pre-set value as it flows to the remaining components of system 10.

The output of pressure regulator 110 is connected to backflow preventer 120. Pressure regulator 110 may be connected directly to backflow preventer 120 or the present invention may be configured so that some type of connector, such as a union, nipple, coupling, and the like is utilized to connect pressure regulator 110 to backflow preventer 120. Backflow preventer 120, as illustrated in FIG. 2, is connected to pressure regulator 110 and primary liquid hose 130. Backflow preventer 120 is advantageous as it operates to prevent any liquids or other matter in primary liquid hose 130 from back-flowing into a user's primary liquid supply. For example, when a user's water supply is the primary liquid supply, backflow preventer 120 prevents any chemicals that may be in primary liquid hose 130 from back-flowing into and contaminating the user's water supply. Any such backflow is prevented because any chemicals that may flow back toward pressure regulator 110 will stop at backflow preventer 120 because backflow preventer 120 will prevent liquids/chemicals from flowing back past backflow preventer 120 toward pressure regulator 110.

As illustrated in FIG. 2, the input end of primary liquid hose 130 connects to back flow preventer 120 and the output end of primary liquid hose 130 connects to one of three ports 171, 172, or 173 of valve 170. Ports 171 and 172 can be seen in FIG. 2 and ports 171 and 173 are illustrated in FIG. 3. In the preferred embodiment, output end of primary liquid hose 130 connects to port 172 of valve 170. In connecting to valve 170, primary liquid hose 130 provides a path for the primary liquid supply from primary supply hose 101 to flow from the user's supply to valve 170. As the primary liquid supply flows into port 172 of valve 170, the primary liquid supply may proceed on to one of 3 flow paths depending on the user's mode of operation.

As illustrated in FIG. 3, an embodiment of the present invention may be configured so that a user may select from one of three modes of operation: (1) solvent (soap) mode; (2) off mode; and (3) rinse mode. The present invention is not limited to these three modes of operation as the present invention may be configured so that a user may select any number of operations. In such an embodiment, valve 170 may also be configured so that it is different than a three-way valve depending on the number of choices/flow paths needed for the distribution of the hyper-concentrated chemical.

During solvent mode, a user would turn the valve handle 174, with position arrow 175, to the left (counter-clockwise) so that position arrow 175 is pointing to the left or towards the "solvent" indicator or wording. When valve handle 174 is positioned for solvent operation, the valve is configured so that the flow of the primary liquid supply through primary liquid hose 130 will flow into port 172 of valve 170 and flow through valve 170 out of port 171 of valve 170 into pump supply hose 131. Pump supply hose 131 connects the output of port 171 of valve 170 to pump 140 at connector 160. Connector 160 operates to connect pump supply hose 131 to an input port 141 of pump 140. Thus, pump supply hose 131 provides a passageway for the primary liquid to flow through valve 170 and into pump 140 when a user has selected the solvent mode of operation.

When the primary liquid enters into pump 140, the flow of the primary liquid and the force from the flow will power and drive pump 140. Once pump 140 begins to operate, pump 140 will create a pulling-up/suction force at pump head 145 to chemical input hose 132 to suck and/or pull chemicals up out of bulk chemical supply 500 into pump head 145.

As the primary liquid (i.e. water) flows into pump 140 at input port 141 to activate pump 140, the primary liquid will continue to be pushed out of/flow out of pump 140 at pump output port 142. As illustrated in FIG. 2, the primary liquid will flow out of port 142 and into pump output hose 134. Pump output hose 134 is preferably connected to pump output port 142 with connector 162 and connected to check valve 152 with connectors 158 and 159. However, the present invention is not limited to such a configuration as output hose 134 may be configured so that it connects directly to output port 142 and check valve 152 without connectors. Pump output hose 134 provides a passageway for the primary liquid supply to be pushed out of/flow out of pump 140 and into check valve 152. Primary liquid that flows into pump 140 at input port 141 will flow into pump 140 and be pushed out of/flow out of pump 140 at pump output port 142 on to check valve 152 and will then flow through connector 156 on to mixing tee 153 as illustrated in FIG. 2. While FIG. 2 illustrates the use of connector 156 to connect check valve 152 to mixing tee 153, the present invention is not limited to such a configuration. In alternative embodiments, check valve 152 may connect directly to mixing tee 153 without the need for connector 156.

The suction force created by the operation of pump 140 will suck-up/pull whatever matter that chemical input hose 132 may be connected to, such as a hyper-concentrated solvent based cleaner. After the hyper concentrated chemical matter is sucked up, it proceeds through chemical input hose 132 to pump head 145. When the present invention is in solvent mode, pump 140 may be continuously driven by a liquid power/force from a primary liquid supply, such as water, so that when an amount of hyper concentrated chemical matter is sucked up chemical input hose 132 into pump head 145, an amount of the hyper-concentrated chemical will then be discharged out of pump head 145 through chemical output hose 133. In one embodiment, pump 140 may be configured so that a ball-check-valve is located within pump head 145. This ball-check-valve will allow the flow of the chemicals (sucked into pump head 145) into pump head 145. When pump 140 operates to apply the suction force at pump head 145, this suction force will unseat the ball-check-valve in pump head 145 thereby allowing the chemicals to flow into pump head 145. During the next cycle, the injection cycle, pump 140 applies a force that will seat the ball-check-valve in pump head 145 and chemicals will be injected/forced under pressure out of pump head 145 under sufficient pressure to flow through output hose 133 and into mixing tee 153. However, the present invention is not limited to such configuration. While pump 140 in FIG. 2 is illustrated as containing one pump head 145, the present invention may be configured to include a pump that comprises two heads that would assist in delivering a steady flow of chemicals during each cycle of the pump.

Chemical output hose 133 is connected to pump head 145 on one end and connected to check valve 151 on the opposite end. Chemical output hose 133 is preferably connected to pump head 145 with connector 161 and connected to check valve 151 with connector 157. However, the present invention is not limited to such a configuration as output hose 133 may be configured so that it connects directly to pump head 145 and check valve 151 without connectors. Chemical output hose 133 provides a passageway for chemical discharged out of pump head 145 to flow to check valve 151. Chemical that has been discharged out of pump head 145 will flow on to check valve 151 and will then flow on to mixing tee 153 as illustrated in FIG. 2. While FIG. 2 illustrates mixing tee 153 as being within enclosure 100, the present invention is not limited to such configuration as alternative embodiments may be configured so that mixing tee 153 is located outside of enclosure 100.

Check valves 151 and 152 are advantageous as they operate to allow flow to proceed in only one direction—downstream or away from pump 140. When water flows through check valve 152 and when chemical flows through check valve 151, these valves operate to prevent any of the corresponding water or chemical from flowing in a reverse direction back into pump 140. Such flow control provided by the check valves helps to increase the life of the pump by preventing and/or reducing the amount of flow of either the chemicals or water-chemical mixture flowing back into the body of pump 140.

As discussed above, during a solvent or soap mode of operation, the primary liquid supplied to system 10, such as a water supply, will flow (1) through primary liquid hose 130, through valve 170 and then into and through pump 140, (2) on through check valve 152, and (3) on to mixing tee 153 where the primary liquid will preferably mix with the hyper-concentrated chemicals. The chemicals from bulk chemical supply 500 will flow (1) through chemical input hose 132, into and out of pump head 145, through chemical output hose 133, (2) on through check valve 151, and then (3) on to mixing tee 153 where the hyper-concentrated chemical will mix with the primary liquid supply. As such, the primary liquid supply and the hyper-concentrated chemical from bulk chemical supply 500 will both flow into mixing tee 153 and mix at that point inside of tee 153. The dynamics of the mixing process inside of mixing tee 153 may be modified depending on the size of mixing tee 153. In some embodiments, a large mixing tee may be utilized to increase the volume inside of the mixing tee 153 which can alter the dynamics of the mixing inside of mixing tee 153. While the chemical and primary liquid, preferably water, are beginning to mix at tee 153, the mixing process will continue as the flow of the hyper-concentrated chemical and primary liquid continues through the remainder of system 10. The chemical/primary liquid mixture will continue to flow out of mixing tee 153 into output tee 154 through input port 154A of output tee 154 as illustrated in FIG. 3. The present invention may also be modified so that any number of different types of mixing chambers may be utilized for mixing tee 153. For example, a non-moving mixer or static mixer may be utilized as mixing tee 153 depending on the use of system 10. Such static mixers may take any shape and may be comprised of any number of materials, such as steel, chrome, plastic, PVC, stainless steel, Teflon, Kynar, any number of polymers, polyacetal, and the like. In addition, mixing tee may be a static mixer in which the mixing housing is made of one material while the inner mixer is comprised of a different material and the inner mixer may be in any configuration, such as a spiral mixer, an alternating-spiral mixer, and the like. The present invention may also be configured so that a second static mixer may be utilized to assist with additional mixing of the chemical mixture. For example, in some embodiments, the present invention may be configured so that a static mixer or mixing chamber may be installed after output tee 154 and/or just before hose 600 to provide an additional mixing mechanism to the present invention.

As illustrated in FIGS. 2 and 3, output tee 154 is preferably configured so that input port 154A of output tee 154 extends through enclosure 100 and connects to mixing tee 153. The connection of output tee 154 to mixing tee 153 may be accomplished with a connector, such as a nipple, a coupling, a union, a piece of hose or a tube fastened to both tees, and the like. However, the present invention may be configured differently so that a portion of mixing tee 153 extends out of enclosure 100 and connects to output tee 154. Any such configuration may be utilized in various embodiments of the present invention.

As the chemical/primary liquid mixture flows out of mixing tee 153 into output tee 154 through input port 154A, the chemical/primary liquid mixture will initially flow in two paths. The flow will travel through output port 154B of output tee 154 through connector 163 and into bucket tee 155. Bucket tee 155 is advantageous as it may provide a user with another outlet for dispensing or obtaining the primary liquid/hyper-concentrated chemical mixture. In some embodiments, a hose or other outlet means, such as a spigot, faucet, valve, or the like may be connected to output port 155A of bucket tee 155 which can enable a user to obtain some of the mixture without having to use output hose 600. For example, if an individual is utilizing system 10 to clean an area of an industrial facility and needs a small amount of the hyper-concentrated/primary liquid mixture to place in a bucket to use with a brush in the bucket, a user may obtain the mixture from bucket tee 155 instead of utilizing hose 600. However, as illustrated in FIG. 3, an embodiment of the present invention may be configured so that the top output port 155A of bucket tee 155 is capped off with plug 180 so that there would be no way to dispense the mixture out of bucket tee 155.

After the primary liquid/hyper-concentrated chemical mixture flows into bucket tee 155 it can flow out of side port 155B of output tee 155. During solvent mode, valve 170 will block any flow out of side port 155B of output tee 155 so that flow will stop at valve 170 and not travel any further.

The second path out of output tee 154 is to the left out of port 154C of output tee 155 through connector 165 on to output hose 600. A user may then utilize output hose 600, which may be of any length, typically 50 to 200 feet depending on user's needs, to transport the chemical/primary liquid mixture and apply the mixture as needed. For example, if system 10 were located on an offshore oil platform and utilized for dispensing a solvent based cleaner, a user could hook up a water supply to system 10 via primary supply hose 101 and then choose solvent operation mode. System 10 would then suck up the hyper-concentrated solvent based chemical cleaner and mix it with the proper amount of water and discharge that mixture through hose 600. A user could then utilize hose 600 to spray/dispense the solvent based mixture as needed for cleaning.

In alternative embodiments, system 10 may be configured to include a foaming attachment that operates to foam the ready to use cleaner/degreaser. The foaming attachment, may, for example, be a double hose that replaces hose 600 with a first hose for the ready to use chemical and a second hose to deliver pressurized air to the ready to use chemical in order to foam the ready to use chemical. In such an embodiment, the air may be delivered to a foaming wand/nozzle located at the end of the double hose. A user would then have the option to choose a foam output. By choosing a foam output, pressurized air would be injected into the primary liquid/hyper-concentrated chemical mixture so that a user could output the mixture as foam as opposed to dispensing the mixture in a straight liquid form. The purpose of foaming is to alter the cleaner/degreaser with induced air bubbles so that the foam cleaner/degreaser will adhere to surfaces, particularly vertical surfaces, for a longer time during "soaking." This provides a more effective cleaning and may reduce the amount of chemical used. The user may also control the air to chemical percentage with valves that may be provided on the foaming wand/nozzle. In this embodiment, a pressurized air supply is provided in addition to a primary liquid supply, such as a water supply.

In addition to the solvent mode of operation, a user can utilize system 10 in the rinse mode to simply apply the primary liquid without any of the hyper-concentrated chemicals in bulk chemical supply 500. Thus, the present invention is further advantageous as only one output hose, hose 600, is needed to both apply the primary liquid/chemical mixture and later rinse with only the primary liquid. In utilizing only one output hose, hose 600, the user is prevented from having to carry multiple hoses while utilizing the present invention. During rinse mode, a user would turn the valve handle 174, with position arrow 175, to the right (clock-wise) so that position arrow 175 is pointing to the right or towards the "rinse" indicator or wording. When valve handle 174 is positioned for rinse operation, the valve 170 is configured so that the flow of the primary liquid supply from primary supply hose 101 will flow: (1) through pressure regulator 110, (2) through backflow preventer 120, (3) through primary liquid hose 130, (4) into port 172 of valve 170, and then (5) flow through valve 170 out of port 173 of valve 170. In rinse mode, a pathway to port 171 of valve 170 is shut off so that the flow in valve 170 will only flow out of port 173 into bucket tee 155. As discussed above, port 155A of bucket tee may be plugged so that the flow can only flow out of bucket tee 155 and into output tee 154 on to hose 600 through connector 165. In such an embodiment, a user can utilize hose 600 to dispense the primary liquid with out any chemicals. For example, when a user utilizes system 10 to clean a portion of a tank in an industrial facility, the user may wish to rinse the tank with water after the water/hyper-concentrated solvent based cleaner has already been applied to the tank. Thus, the user would select rinse mode and utilize hose 600 to dispense only the primary liquid, water, onto the tank in order to rinse the tank during or after cleaning.

As discussed above, the present invention may be configured so that bucket tee 155 may provide a user with another outlet for dispensing or obtaining only the primary liquid, such as water, in rinse mode. A hose or other outlet means, such as a spigot, faucet, valve, or the like may be connected to output port 155A of bucket tee 155 which can enable a user to obtain some of the primary liquid without having to use output hose 600. For example, if a user wanted a small amount of the primary liquid, the user could obtain the desired amount from bucket tee 155 instead of having to utilize hose 600. In some embodiments, hose 600 may be several hundred feet long and may be a heavy-duty hose that would require a great deal of effort to simply obtain a small quantity of water when a user may simply turn a faucet connected to port 155A of bucket tee 155 and quickly obtain the desired quantity.

During off mode, a user would turn the valve handle 174 as needed so that position arrow 175 is pointing upwards towards the "off" indicator or wording. When valve handle 174 is positioned in the off mode, the valve 170 is configured so that the flow of any primary liquid in primary liquid hose 130 will stop at port 172 as valve 170 will be blocked so that no flow can enter port 172. With no flow through port 172, there will be no flow out of port 171 and thus, no flow into pump 140. With no flow into pump 140, the pump will not operate and no hyper-concentrated chemical will be sucked up out of bulk chemical supply 500. Thus, in off mode, the pump 140 will not operate and the flow path to output hose 600 will be blocked.

In a preferred embodiment, system 10 may be configured so that the amount of hyper-concentrated chemical sucked up from bulk chemical supply 500 and discharged out of pump head 145 may be controlled by a user through the user's configuration of pump 140. As illustrated in FIG. 2, pump 140 includes adjustment member 143 that allows a user to alter/adjust the stroke length of the pump which can alter the amount of hyper-concentrated chemicals sucked into pump head 145. Depending on a user's needs, a user may configure pump 140 via adjustment member 143 by adjusting the stroke length of the pump so that it may discharge either (1) a greater volume of hyper-concentrated chemical for a stronger chemical/primary liquid mixture or (2) a smaller volume of hyper-concentrated chemical for a weaker chemical/primary liquid mixture. Thus, embodiments of the present invention may allow users to customize the percentage of hyper-concentrated chemical that will be mixed with the primary liquid supply depending on the user's needs or wishes. For example, a user may increase the amount of hyper-concentrated chemicals utilized for efficiency purposes or a user may reduce the amount of chemicals used for economical reasons, such as to cut back on costs. In addition, after a user has configured the system to a particular setting, enclosure 100 can be locked so that unauthorized personnel can not change the user's desired setting. In alternative embodiments, system 10 may also be configured so that a user may configure pump 140 to modify the volume of primary liquid discharged out of pump output port 142 which will result in modifying the chemical/primary liquid supply mixture by adding more or less of the primary liquid supply. Because the primary liquid supply dilutes the hyper-concentrated chemical when the two are mixed, a user may control the volume of primary liquid discharged which ultimately controls the diluting of the hyper-concentrated chemical which will alter the strength or potency of the mixture output through hose 600. However, the present invention is not limited to such configurations as an embodiment of the present invention may be configured so that a user may control/alter both the volume of primary liquid discharged and the volume of hyper-concentrated chemical discharged to achieve a desired potency or strength.

The present invention is configured to minimize the pressure drop across the various components so that there is sufficient pressure remaining at the output through hose 600 so that a user may still utilize an output hose 600 up to at least a 200 foot length to discharge the chemical mixture. In a preferred embodiment of the present invention, the arrangement of piping, hoses, and connectors is unique in that it operates to minimize the pressure drop/difference between the inlet pressure of the primary liquid supply and the outlet pressure through/at hose 600. The pressure drop in such a preferred embodiment may range typically from 10 to 20 psi. The remaining or "unused pressure drop" is advantageous in throwing a strong spray of chemical through hose 600 and any nozzle attachment at the end of hose 600 at the "point of use." For example, if the inlet pressure at hose 101 is 40 psi, the configuration in a preferred embodiment is such that the pressure output at hose 600 may range from 20 to 30 psi. This 10 to 20 psi drop is merely an example of the pressure drop in one embodiment of the present invention and alternative embodiments of the present invention may result in different pressure drops. In achieving this minimal 10 to 20 psi pressure drop in a preferred embodiment, the various hoses may be arranged and configured as follows: (1) hoses 130 and 131 as ¾ inch in diameter; (2) hoses 133 and 134 are preferably ½ inch in diameter; and (3) hose 132 is a ¾ inch diameter hose. In addition, in order to achieve the desired minimum pressure drop, hose 130 is preferably sized between 30 to 36 inches in length, hose 131 is preferably sized between 12 to 18 inches in length, hose 133 is preferably sized between 8 to 20 inches in length, hose 134 is preferably sized between 4 to 12 inches in length, and hose 132 is preferably sized between 3 to 10 feet in length. The measurements and configurations listed above are advantageous as such configuration illustrates an embodiment that achieves a minimal pressure drop across the system. However, these measurements and configurations are not to be construed as limitations to the entire inventive concept but merely as a specific example of one embodiment of the present invention as alternative embodiments may be configured to different specifications.

The present invention is not limited to dispensing any particular hyper-concentrated chemical. Any variety of chemicals may be dispensed in the various embodiments of the present invention disclosed herein, including without limitation: (1) a hyper-concentrated chemical including at least a surfactant blend of 15 to 20% and a Naphtha based solvent of 75 to 85%; (2) a hyper-concentrated chemical including at least a sodium hydroxide of 5 to 15% and a glycol based surfactant mixture of 30 to 60% that may comprise some ethylene glycol monobutyl ethers; and (3) a hyper-concentrated chemical including at least a surfactant blend of 35 to 45% and a 1-methyl-4-(1-methylethenyl)cyclohexene of 45 to 55%. However, any number of hyper-concentrated chemicals may be dispensed with the present invention as the hyper-concentrates enumerated herein are merely an example of some hyper-concentrates dispensed with the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for dispensing hyper-concentrated chemicals, said system comprising:
- a pump with at least one pump head;
- a selector valve for selecting different modes of operation;
- a mixing chamber;
- a first hose that provides a flow path for a primary liquid, from a primary liquid supply, to flow to said selector valve;
- a second hose that provides a flow path for said primary liquid to flow from said selector valve to an input port of said pump wherein said primary liquid drives said pump;
- a third hose that provides a flow path for a hyper-concentrated chemical to flow into said pump head;
- a fourth hose that provides a flow path for said hyper-concentrated chemical to flow from said pump head to said mixing chamber;
- a fifth hose that provides a flow path for said primary liquid to flow from said pump to said mixing chamber;
- an output hose; and
- a fitting that provides a flow path from said mixing chamber to said output hose.

2. The system of claim 1 further comprising:
- a second fitting connected to an output port of said selector valve wherein said second fitting provides a flow path from an output port of said selector valve to a third fitting;
- wherein said third fitting is connected to said second fitting and said third fitting provides a flow path from said second fitting to said fitting that provides a flow path from said mixing chamber to said output hose; and
- a shut-off valve that can shut-off flow of said primary liquid supply to said first hose.

3. The system of claim 2 further comprising
- a filter for filtering said primary liquid prior to said primary liquid flowing into said first hose; and
- a pressure regulator for regulating the pressure of said primary liquid before said primary liquid flows into said first hose.

4. The system of claim 3 further comprising
- a backflow prevention device located between said shut off valve and said first hose wherein said backflow prevention device assists in preventing matter within said first hose from flowing back into said primary liquid supply.

5. The system of claim 4 further comprising an enclosure wherein said pressure regulator, said backflow prevention device, said first hose, said second hose, said fourth hose, said fifth hose, and said pump are positioned within said enclosure.

6. The system of claim 5 further comprising a stand wherein said stand:
- provides a mounting location for said enclosure; and
- provides a resting location that is capable of holding a container of hyper-concentrated chemicals.

7. The system of claim 6 wherein said stand further comprises wheels mounted to said stand.

8. The system of claim 7 wherein said stand further comprises a holder for holding said output hose.

9. The system of claim 5 further comprising:
- an insert that can connect to said hyper-concentrated chemical supply;
- a coupler connected to an end of said third hose and connected to said insert whereby said connection of said coupler to said insert creates a flow path for said hyper-concentrated chemicals to flow from said hyper-concentrated chemical supply into said third hose.

10. The system of claim 9 wherein said insert comprises:
- an adaptor member;
- an inner threaded portion;
- a color coded key member that identifies a color configuration of said insert; and
- a tube member.

11. The system of claim 10 wherein said coupler comprises:
- a vent valve;
- a threaded region that is configured to thread into said inner threaded portion of said insert;
- a color coded key member that is configured to connect to said color coded key member of said insert only when said color coded key member of said coupler matches the color of said color coded key member of said insert wherein said color coded key member of said coupler and said color coded key member of said insert act as safety identifiers by notifying users to only connect couplers to inserts when the colors of said color coded key members match;
- a tube member; and
- a handle for assisting a user to fasten said coupler to said insert.

12. The system of claim 11 wherein said output hose comprises a nozzle for spraying matter flowing through said output hose out of said output hose.

13. The system of claim 11 wherein said output hose comprises:
- a first hose that provides a flow path for matter exiting out of said mixing chamber;
- a second hose that injects air into said matter exiting out of said mixing chamber thereby creating a foam mixture; and
- a nozzle for discharging said foam mixture.

14. A system for (1) mixing a hyper-concentrated solvent based chemical with a primary liquid to create a non-hyper-concentrated chemical mixture, and (2) dispensing said non-hyper-concentrated chemical mixture, said system comprising:
- an enclosure;
- a mixing chamber located within said enclosure;
- a pump with at least one pump head wherein said pump is mounted inside of said enclosure;
- a selector valve for selecting different modes of operation mounted outside of said enclosure;
- a connector for connecting a primary liquid supply to said system;
- a shut-off valve for shutting off a flow of said primary liquid to said system;
- a strainer for filtering said primary liquid;
- a pressure regulator located inside of said enclosure and connected downline of said strainer wherein said pressure regulator regulates the pressure of said primary liquid entering into said system;

a backflow preventer located inside of said enclosure and connected downline of said pressure regulator;

a first hose located inside of said enclosure that provides a flow path for said primary liquid to flow from said pressure regulator to said selector valve wherein said backflow preventer operates to prevent any matter from backflowing through said first hose into said primary liquid supply;

a second hose located inside of said enclosure that provides a flow path for said primary liquid to flow from said selector valve to an input port of said pump wherein said primary liquid supply drives said pump when said primary liquid enters into said input port of said pump;

a third hose that provides a flow path for said hyper-concentrated solvent based chemical to flow into said pump head whereby one end of said third hose connects to said pump and the other end of said third hose connects to a source of said hyper-concentrated solvent based chemical;

a fourth hose located inside of said enclosure that provides a flow path for said hyper-concentrated solvent based chemical to flow from said pump head to said mixing chamber;

a fifth hose located inside of said enclosure that provides a flow path for said primary liquid to flow from said pump to said mixing chamber;

an output hose located outside of said enclosure; and a first fitting that provides a flow path from said mixing chamber to a tee fitting wherein said tee fitting is located outside of said enclosure and provides a flow path from said first fitting to said output hose.

15. The system of claim 14 further comprising:

a first check valve located inside of said enclosure and mounted in-between said fourth hose and said mixing chamber; and a second check valve located inside of said enclosure and mounted in-between said fifth hose and said mixing chamber whereby said first check valve and said second check valve only allow flow to proceed away from said pump and towards said mixing chamber.

16. The system of claim 15 further comprising:

a second fitting located inside of said enclosure and mounted in-between said first check valve and said mixing chamber; and a third fitting located inside of said enclosure and mounted in-between said second check valve and said mixing chamber.

17. The system of claim 14 wherein:

said primary liquid supply is water; and said hyper-concentrated solvent based chemical mixes with said water in said mixing chamber resulting in a diluted/non-hyper-concentrated chemical mixture.

18. The system of claim 14 wherein:

when said primary liquid flows through said first hose and through said second hose into said pump, said primary liquid:

operates to drive said pump whereby said pump creates a suction force to suck up an amount of said hyper-concentrated solvent based chemical through said third hose into said pump head; and flows into said pump and out of said pump through said fifth hose.

19. The system of claim 14 wherein said pump comprises an adjustment member for adjusting the operation of said pump which adjusts the amount of hyper-concentrated solvent based chemical sucked up into said pump head thereby altering the makeup of said non-hyper-concentrated chemical mixture.

20. A method for dispensing hyper-concentrated chemicals in a non-hyper-concentrated state, said method comprising:

defining a system for dispensing hyper-concentrated chemicals wherein said system comprises:

a pump with at least one pump head;

a three-way selector valve for selecting three different modes of operation comprising an off mode, a solvent mode, and a rinse mode;

a mixing chamber;

a first hose that provides a flow path for a primary liquid supply to flow to said three-way selector valve;

a shut-off valve that can shut-off flow of said primary liquid supply to said first hose;

a fitting that connects said primary liquid supply to said shut-off valve;

at least one fitting that connects said shut-off valve to said first hose;

a second hose that provides a flow path for said primary liquid supply to flow from said three-way selector valve to an input port of said pump wherein said primary liquid supply drives said pump;

a third hose that provides a flow path for a hyper-concentrated chemical to flow into said pump head;

a fourth hose that provides a flow path for said hyper-concentrated chemical to flow from said pump head to said mixing chamber;

a fifth hose that provides a flow path for said primary liquid to flow from said pump to said mixing chamber;

an output hose;

a fitting that provides a flow path from said mixing chamber to said output hose;

a coupler connected to an end of said third hose; and an insert that is configured to connect to a container housing said hyper-concentrated chemical supply wherein said coupler connects to said insert whereby said connection of said coupler to said insert creates a flow path for said hyper-concentrated chemicals to flow from said container into said third hose;

connect said primary liquid supply to said fitting that connects said primary liquid supply to said shut-off valve;

position said shut-off valve to an on position to allow flow of said primary liquid supply through said shut-off valve;

connect said insert to said container;

connect said coupler to said insert;

position said three-way selector valve to the solvent mode; and turn on said primary liquid supply.

* * * * *